(12) United States Patent
Moon et al.

(10) Patent No.: US 11,863,850 B2
(45) Date of Patent: Jan. 2, 2024

(54) CAMERA MODULE

(71) Applicant: LG INNOTEK CO., LTD., Seoul (KR)

(72) Inventors: Da Hin Moon, Seoul (KR); Je Kyung Park, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 384 days.

(21) Appl. No.: 17/311,079

(22) PCT Filed: Dec. 19, 2019

(86) PCT No.: PCT/KR2019/018066
§ 371 (c)(1),
(2) Date: Jun. 4, 2021

(87) PCT Pub. No.: WO2020/130659
PCT Pub. Date: Jun. 25, 2020

(65) Prior Publication Data
US 2022/0046146 A1 Feb. 10, 2022

(30) Foreign Application Priority Data
Dec. 19, 2018 (KR) .................. 10-2018-0165367

(51) Int. Cl.
H04N 23/51 (2023.01)
H04N 23/54 (2023.01)
(52) U.S. Cl.
CPC ............. H04N 23/51 (2023.01); H04N 23/54 (2023.01)

(58) Field of Classification Search
None
See application file for complete search history.

(56) References Cited

U.S. PATENT DOCUMENTS

| 10,935,873 | B2 * | 3/2021 | Nakamura | H05K 9/00 |
| 2011/0063498 | A1 | 3/2011 | An et al. | |
| 2013/0162894 | A1 | 6/2013 | Lee | |
| 2013/0265470 | A1 | 10/2013 | Liu et al. | |
| 2018/0224716 | A1 * | 8/2018 | Joo | H05K 1/142 |
| 2018/0255213 | A1 * | 9/2018 | Ahn | B60R 1/00 |
| 2019/0121050 | A1 * | 4/2019 | Park | H04N 23/00 |
| 2019/0132954 | A1 | 5/2019 | Kim et al. | |

(Continued)

FOREIGN PATENT DOCUMENTS

| CN | 107031524 A | 8/2017 |
| CN | 108202481 A | 6/2018 |

(Continued)

Primary Examiner — Rodney E Fuller
(74) Attorney, Agent, or Firm — Birch, Stewart, Kolasch & Birch, LLP

(57) ABSTRACT

Provided is a camera module. The camera module according to one aspect of the present invention comprises: a housing; a substrate arranged on the housing; a substrate supporting member arranged on the housing and supporting the substrate; and a coupling member that fixes the substrate on the housing, wherein the substrate supporting member includes a body, an extending portion which extends from the body to be disposed between the substrate and the inside surface of the housing, a hole formed in the extending portion, and a bent portion which extends from the extending portion inwardly of the hole and towards the substrate.

20 Claims, 7 Drawing Sheets

(56) References Cited

U.S. PATENT DOCUMENTS

| | | | |
|---|---|---|---|
| 2020/0053258 A1* | 2/2020 | Park | H04N 23/52 |
| 2020/0225507 A1* | 7/2020 | Awazu | H04N 23/687 |
| 2023/0221623 A1* | 7/2023 | Lee | H04N 23/52 |
| | | | 396/25 |

FOREIGN PATENT DOCUMENTS

| | | |
|---|---|---|
| CN | 108293086 A | 7/2018 |
| EP | 2 574 037 A1 | 3/2013 |
| EP | 3 340 599 A1 | 6/2018 |
| JP | 2001-156990 A | 6/2001 |
| JP | 2004-253509 A | 9/2004 |
| JP | 2008-311468 A | 12/2008 |
| JP | 2014-150840 A | 8/2014 |
| JP | 2014-210041 A | 11/2014 |
| KR | 10-0485629 B1 | 4/2005 |
| KR | 10-2017-0027073 A | 3/2017 |
| KR | 10-2018-0010422 A | 1/2018 |
| KR | 10-1832496 B1 | 2/2018 |
| WO | WO 2017/179924 A1 | 10/2017 |

\* cited by examiner

10

CAMERA MODULE

CROSS REFERENCE TO RELATED APPLICATIONS

This application is the National Phase of PCT International Application No. PCT/KR2019/018066, filed on Dec. 19, 2019, which claims priority under 35 U.S.C. 119(a) to Patent Application No. 10-2018-0165367, filed in the Republic of Korea on Dec. 19, 2018, all of which are hereby expressly incorporated by reference into the present application.

TECHNICAL FIELD

The present embodiment relates to a camera module.

BACKGROUND ART

Recently, ultra-compact camera modules have been developed, and ultra-compact camera modules are widely used in small electronic products such as smart phones, notebook computers, and game consoles.

As automobiles are popularized, ultra-compact camera modules are widely used not only in small electronic products but also in vehicles. For example, it is equipped with a black box camera for vehicle protection or objective data of traffic accidents, a rear surveillance camera that enables the driver to monitor the blind spot at the rear of the vehicle through the screen to ensure safety when the vehicle is reversing, an surrounding detection camera that can monitor the vehicle's surroundings, and the like.

The exterior member of a vehicle camera module is generally formed by combining a front body, in which a lens barrel is disposed, and a rear body, in which electronic components are accommodated, and metal or plastic is used as a material. Plastic materials are widely used because they have an advantage in that the material cost is low, and the front body and the rear body are combined by ultrasonic or laser fusion, so that the component accommodating area become widened.

Meanwhile, when manufacturing the camera module, the ground portion of the substrate and the shield are grounded, and the substrate and the shield are screw-coupled to the inside surface of the front body. After that, the front body and the rear body are subjected to ultrasonic or laser fusion. In this case, there is a problem in that the optical axis of the lens and the image sensor is misaligned due to the loosening of the screw by the vibration generated during ultrasonic or laser fusion.

DETAILED DESCRIPTION OF THE INVENTION

Technical Subject

The problem to be solved by the present invention is to provide a camera module capable of preventing the coupling between components from being loosened.

Technical Solution

A camera module according to one aspect of the present invention comprises: a housing; a substrate arranged on the housing; a substrate supporting member arranged on the housing and supporting the substrate; and a coupling member that fixes the substrate on the housing, wherein the substrate supporting member includes a body, an extending portion which extends from the body to be disposed between the substrate and the inside surface of the housing, a hole formed in the extending portion, and a bent portion which extends from the extending portion inwardly of the hole and towards the substrate.

In addition, the extending portion may be extended from an upper end of the body in a direction perpendicular to the optical axis.

In addition, the lower surface of the extending portion may be in contact with the inside surface of the housing.

In addition, the upper surface of the bent portion may be in contact with the lower surface of the substrate.

In addition, the upper surface of the bent portion may be in surface-contact with the lower surface of the substrate.

In addition, the bent portion may be curved at least twice.

In addition, the bent portion may include a first curved portion curved from the extending portion in the direction of the hole, and a second curved portion curved from the first curved portion in a direction opposite to the hole.

In addition, the bent portion may include a plurality of bent portions, and the plurality of bent portions may be spaced apart from each other.

In addition, the extending portion includes two extending portions, and each of the two extending portions may be symmetrical to each other with respect to the optical axis.

In addition, the coupling member may screw-couple the substrate to the inside surface of the housing.

In addition, the housing may include a step portion formed on the inside surface thereof.

In addition, the body of the substrate supporting member may be disposed on a side surface of the step portion, and the extending portion of the substrate supporting member may be disposed on an upper surface of the step portion.

Advantageous Effects

Through this embodiment, a camera module capable of preventing the coupling between parts from being loosened can be provided.

BEST MODE

Hereinafter, preferred embodiments of the present invention will be described in detail with reference to the accompanying drawings.

However, the technical idea of the present invention is not limited to some embodiments to be described, but may be implemented in various forms, and if it is within the scope of the technical idea of the present invention, one or more of the components may be selected, combined, and substituted between the embodiments for use.

In addition, terms (including technical and scientific terms) used in the embodiments of the present invention are generally understood by those of ordinary skill in the technical field to which the present invention belongs unless explicitly defined and described, and it can be interpreted as a meaning, and terms generally used, such as terms defined in a dictionary, may be interpreted in consideration of the meaning in the context of the related technology.

In addition, terms used in the embodiments of the present invention are for describing the embodiments and are not intended to limit the present invention.

In the present specification, the singular form may include the plural form unless specifically stated in the phrase, and when described as "at least one (or more than one) of A and B and C", it may contain one or more of all combinations that can be combined with A, B, and C.

In addition, terms such as first, second, A, B, (a), (b), and the like may be used in describing the components of the embodiment of the present invention. These terms are only for distinguishing the component from other components, and are not limited to the nature, order, or sequence of the component by the term.

And, when a component is described as being 'connected', 'coupled' or 'interconnected' to another component, the component is not only directly connected, coupled or interconnected to the other component, but may also include cases of being 'connected', 'coupled', or 'interconnected' due that another component between that other components.

In addition, when it is described as being formed or disposed in the "top (upper side) or bottom (lower side)" of each component, the top (upper side) or bottom (lower side) not only includes a case when the two components are in direct contact with each other but also includes a case where one or more other components are formed or disposed between the two components. In addition, when expressed as "top (upper side) or bottom (lower side)", the meaning of not only an upward direction but also a downward direction based on one component may be included.

The 'optical axis direction' used below is defined as the optical axis direction of the lens coupled to the lens driving device. Meanwhile, the 'optical axis direction' may correspond to an 'up-down direction', a 'z-axis direction', and the like.

Hereinafter, the present invention will be described in more detail with reference to the accompanying drawings.

Figure 1:
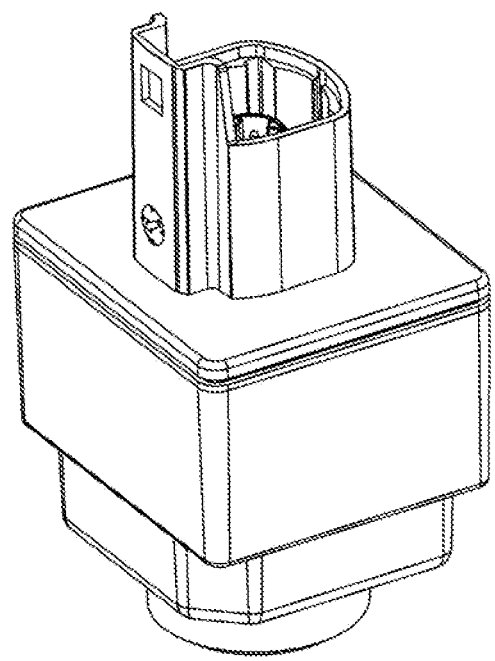
FIG. 1 is a perspective view of a camera module according to an embodiment of the present invention.
Figure 2:
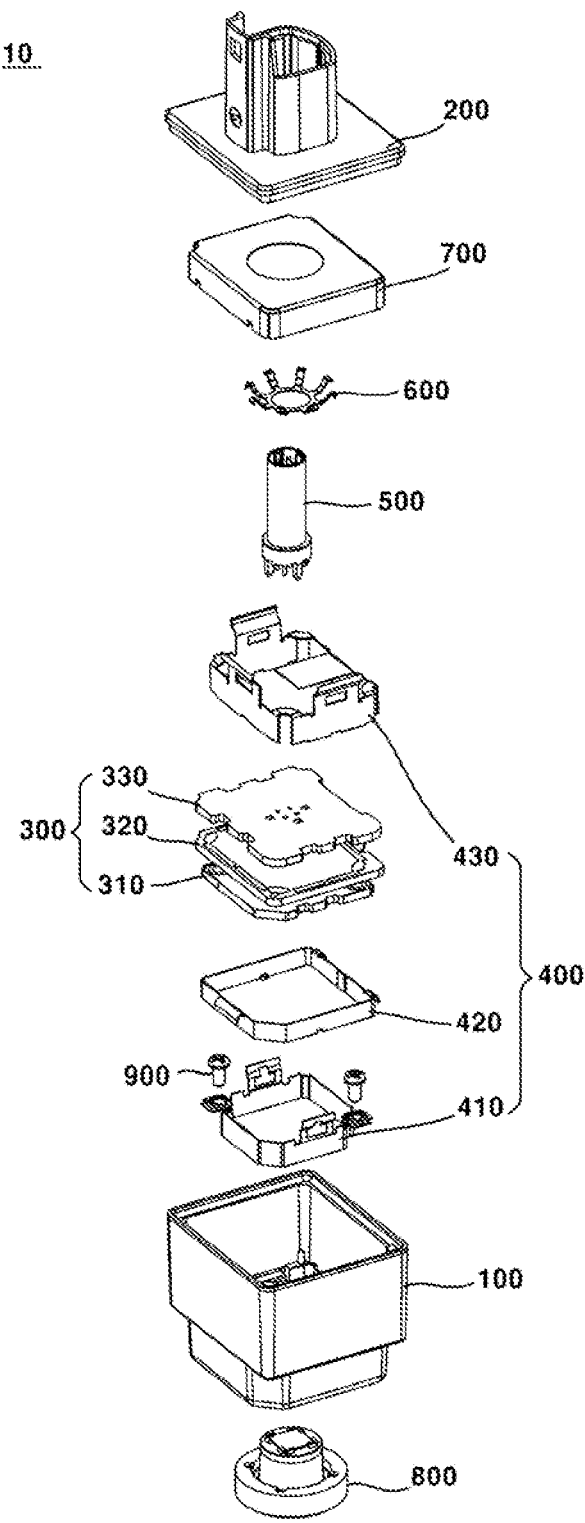
FIG. 2 is an exploded perspective view of a camera module according to an embodiment of the present invention.
Figure 3:
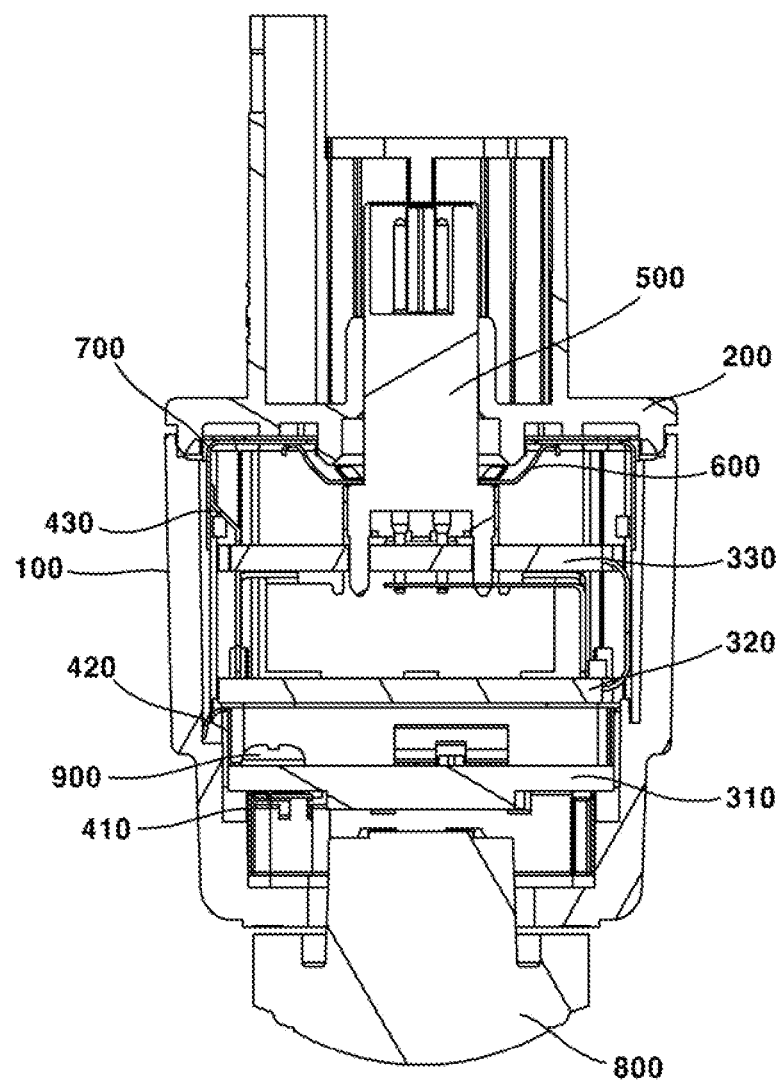
FIG. 3 is a cross-sectional view of a camera module according to an embodiment of the present invention.
Figure 4:
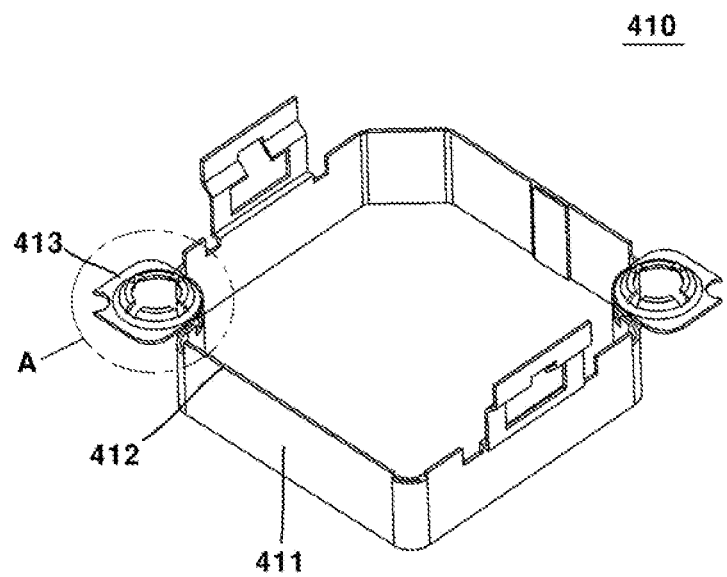
FIG. 4 is a perspective view of a substrate of a camera module according to an embodiment of the present invention.
Figure 5:
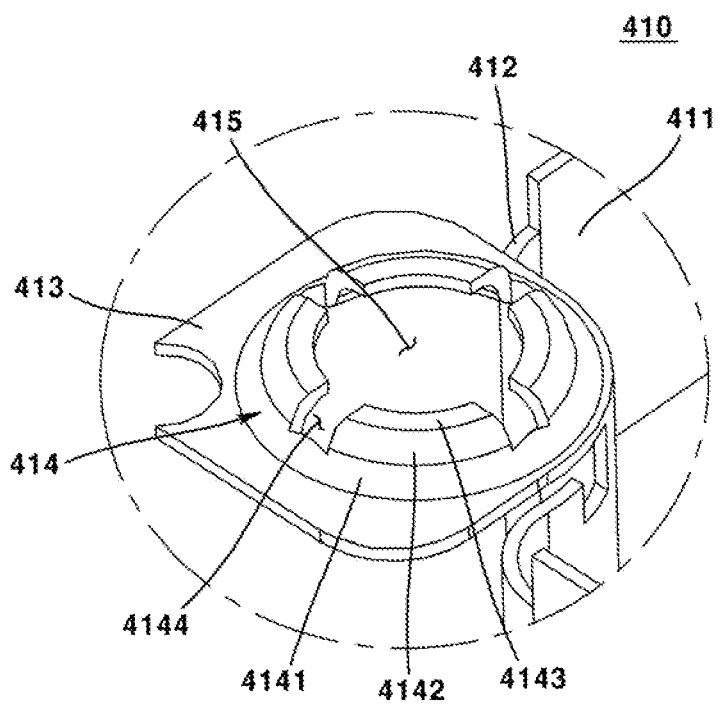
FIG. 5 is an enlarged view of portion A of FIG. 4.
Figure 6:
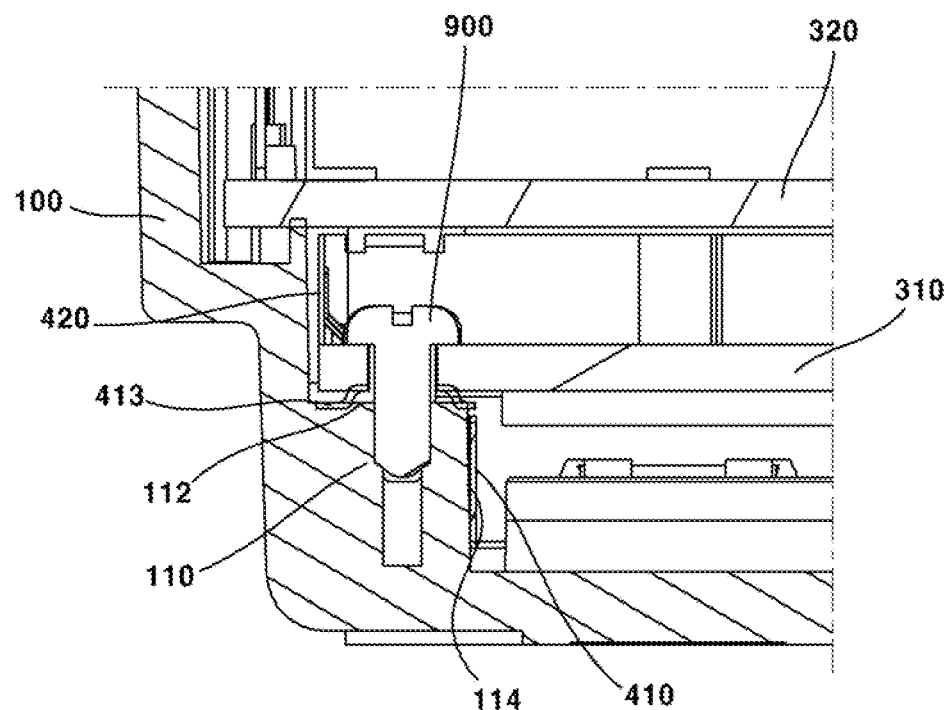
FIG. 6 is a partial cross-sectional view of a camera module according to an embodiment of the present invention.

FIG. 1 is a perspective view of a camera module according to an embodiment of the present invention. FIG. 2 is an exploded perspective view of a camera module according to an embodiment of the present invention. FIG. 3 is a cross-sectional view of a camera module according to an embodiment of the present invention. FIG. 4 is a perspective view of a substrate of a camera module according to an embodiment of the present invention. FIG. 5 is an enlarged view of portion A of FIG. 4. FIG. 6 is a partial cross-sectional view of a camera module according to an embodiment of the present invention.

Referring to FIGS. 1 to 6, the camera module 10 according to an embodiment of the present invention may include housings 100 and 200, a substrate module 300, and a lens module 800. The camera module 10 according to an embodiment of the present invention may further include at least one or more of a substrate supporting member 400, a connector 500, a metal ring 600, a metal cover 700, and a coupling member 900, however, it may be implemented excluding some of these configurations, and it does not exclude additional configurations other than those mentioned above. The substrate supporting member 400 may be formed of a metal material.

In one embodiment of the present invention, the front can be interpreted as meaning a downward direction (down), and a rear meaning an upward direction (up).

The camera module 10 may include housings 100 and 200. The housings 100 and 200 may form the outer appearance of the camera module 10. The housings 100 and 200 may include a first housing 100 and a second housing 200.

The camera module 10 may include a first housing 100. The first housing 100 may be a front body. The first housing 100 may be an exterior member. The first housing 100 may form the outer appearance of the camera module 10. The first housing 100 may be coupled to the second housing 200. The first housing 100 may be coupled to the second housing 200 through ultrasonic fusion welding or adhesion through an adhesive. The first housing 100 may be disposed in front of the second housing 200. The first housing 100 may be formed of a plastic material. The first housing 100 may be formed of a plastic material mixed with carbon or metal. The first housing 100 may be formed of a laser-transmitting plastic material, a laser-transmitting carbon, or a plastic material in which a metal is mixed. The first housing 100 may be grounded with the substrate supporting member 400 to discharge residual electromagnetism to the outside. The first housing 100 may have a hollow formed in the central area. The lens module 800 may be coupled to the hollow of the first housing 100. An inside space may be formed inside the first housing 100. A substrate module 300, a substrate supporting member 400, and a cable 500 may be disposed in the inside space of the first housing 100. The substrate module 300 and the substrate supporting member 400 may be coupled to the inside surface of the first housing 100.

A substrate module 300 and a substrate supporting member 400 may be coupled to the first housing 100. Specifically, a first substrate 310 and a first substrate supporting member 410 may be coupled to the inside surface of the first housing 100. The first substrate 310 and the first substrate supporting member 410 may be coupled to the inside surface of the first housing 100 by a coupling member 900. The first substrate 310 and the first substrate supporting member 410 may be screw-coupled to the upper surface 112 of the step portion 110 of the first housing 100 by the coupling member 900. The inside surface of the first housing 100 may be disposed on the lower surface of the extending portion 413 of the first substrate supporting member 410.

The inside surface of the first housing 100 may include a step portion 110. The step portion 110 may be formed to be protruded upward from the bottom surface of the inside surface of the first housing 100. The step portion 110 may be formed to be protruded inward from the inside surface of the first housing 100. The extension portion 413 of the first substrate supporting member 410 may be disposed on the upper surface 112 of the step portion 110. The lower surface of the extending portion 413 of the first substrate supporting member 410 may be disposed on the upper surface 112 of the step portion 110. The upper surface 112 of the step portion 110 may include a through hole penetrated by the coupling member 900. The body 411 of the first substrate supporting member 410 may be disposed on a side surface 114 of the step portion 110. The side surface 114 of the step portion 110 may be disposed adjacent to the body 411 of the first substrate supporting member 410.

The camera module 10 may include a second housing 200. The second housing 200 may be a rear body. The second housing 200 may be an exterior member. The second housing 200 may form the outer appearance of the camera module 10. The second housing 200 may be coupled to the first housing 100. The second housing 200 may be coupled to the first housing 100 through ultrasonic fusion welding or adhesion through an adhesive. The second housing 200 may be disposed rear of the first housing 100. The second housing 200 may be formed of a plastic material. The second housing 200 may be formed of a plastic material mixed with carbon or metal. The second housing 200 may be formed of a laser-transmitting plastic material, a laser-transmitting carbon, or a plastic material in which a metal is mixed. The second housing 200 may be grounded with the metal cover 700 to discharge residual electromagnetism to the outside. The second housing 200 may include a through hole penetrated by the connector 500. The connector 500 may be coupled to the through hole of the second housing 200. A metal cover 700 may be disposed on the inside surface of the second housing 200. The metal cover 700 may be coupled to the inside surface of the second housing 200 by a method such as adhesion through an adhesive or screw-coupling.

The camera module 10 may include a substrate module 300. The substrate module 300 may be disposed in the first housing 100. The substrate module 300 may be disposed in the inside space of the first housing 100. The substrate module 300 may be coupled to the inside surface of the first housing 100. The substrate module 300 may be screw-coupled to the inside surface of the first housing 100. The substrate module 300 may be disposed in an inside space formed by the coupling of the first housing 100 and the second housing 200. The substrate module 300 may be coupled to the connector 500. The substrate module 300 may be electrically connected to the connector 500. The substrate module 300 may include first to third substrates 310, 320, and 330.

The substrate module 300 may include a first substrate 310. The first substrate 310 may be coupled to the inside surface of the first housing 100. The first substrate 310 may be screw-coupled to the inside surface of the first housing 100 together with the first substrate supporting member 410. An image sensor may be disposed on the front surface of the first substrate 310. The image sensor disposed on the first substrate 310 may face the lens module 800. The first substrate 310 may be disposed in front of the second substrate 320. The first substrate 310 may be spaced apart from the second substrate 320 in the optical axis direction. The first substrate 310 may be electrically connected to the second substrate 320. The first substrate 310 may be electrically connected to the second substrate 320 through a substrate supporting member 400 or a separate flexible printed circuit board (FPCB). The first substrate 310 may include a first ground portion. The first ground portion of the first substrate 310 may be in contact with the first substrate supporting member 410 of the substrate supporting member 400. The first substrate 310 may be in contact with the first substrate supporting member 410. The lower surface of the first substrate 310 may be in contact with an upper surface 4143 of a bent portion 414 of the first substrate supporting member 410. The lower surface of the first substrate 310 may be in surface-contact with the upper surface 4143 of the bent portion 414 of the first substrate supporting member 410. The first substrate 310 may include a through hole penetrated by the coupling member 900. The through hole of the first substrate 310 may be overlapped with a hole 415 of the first substrate supporting member 410 in the optical axis direction. The through hole of the first substrate 310 may be overlapped with the through hole of the upper surface 112 of the step portion 110 of the first housing 100 in the optical axis direction or a vertical direction.

The substrate module 300 may include a second substrate 320. The second substrate 320 may be disposed rear of the first substrate 310. The second substrate 320 may be spaced apart from the first substrate 310 in the optical axis direction. The second substrate 320 may be electrically connected to the first substrate 310. The second substrate 320 may be electrically connected to the first substrate 310 through a substrate supporting member 400 or a separate flexible printed circuit board. The second substrate 320 may include a second ground portion. The second ground portion of the second substrate 320 may be in contact with a second substrate supporting member 420 of the substrate supporting member 400 and/or a third substrate supporting member 430 of the substrate supporting member 400. The second substrate 320 may be disposed in front of the third substrate 330. The second substrate 320 may be spaced apart from the third substrate 330 in the optical axis direction. The second substrate 320 may be electrically connected to the third substrate 330. The second substrate 320 may be electrically connected to the third substrate 330 through a substrate supporting member 400 or a separate flexible printed circuit board.

The substrate module 300 may include a third substrate 330. The third substrate 330 may be disposed rear of the second substrate 320. The third substrate 330 may be spaced apart from the second substrate 320 in the optical axis direction. The third substrate 330 may be electrically connected to the second substrate 320. The third substrate 330 may be electrically connected to the second substrate 320 through a substrate supporting member 400 or a separate flexible printed circuit board. The third substrate 330 may include a third ground portion. The third ground portion of the third substrate 330 may be in contact with the second substrate supporting member 420 of the substrate supporting member 400 and/or the third substrate supporting member 430 of the substrate supporting member 400. A connector 500 may be disposed on the rear surface of the third substrate 330. The connector 500 may be mounted on the rear surface of the third substrate 330. The connector 500 may be coupled to the third substrate 300. A terminal of the connector 500 may be inserted into a coupling hole of the third substrate 300.

In an embodiment of the present invention, the substrate module 300 including three substrates 310, 320, and 330 is described as an example, but is not limited thereto, and may include two substrates 310 and 330 or four or more substrates. In addition, the first to third substrates 310, 320, and 330 may be a printed circuit board (PCB) in the form of a square plate.

The camera module 10 may include a substrate supporting member 400. The substrate supporting member 400 may be disposed in the first housing 100. The substrate supporting member 400 may accommodate the substrate module 300 therein. The substrate supporting member 400 may be electrically connected to the substrate module 300. The substrate supporting member 400 may be coupled to the inside surface of the first housing 100. The substrate supporting member 400 may be in contact with the metal cover 700. The substrate supporting member 400 may be formed of a metal material. The substrate supporting member 400 may be formed of a metal plate forming a plurality of side surfaces. The substrate supporting member 400 may block electromagnetic interference (EMI). The substrate supporting member 400 may block radio waves generated from the outside from flowing into the substrate module 300. The substrate supporting member 400 may be in contact with the ground portion of the substrate module 300. The substrate supporting member 400 may ground the substrate module 300. Residual electromagnetism remaining in the substrate module 300 may be accumulated in the substrate supporting member 400. The substrate supporting member 400 may include first to third substrate supporting members 410, 420, and 430.

The substrate supporting member 400 may include a first substrate supporting member 410. The first substrate supporting member 410 may be disposed between the first housing 100 and the first substrate 310. The first substrate supporting member 410 may be disposed between the inside surface of the first housing 100 and the first substrate 310. The first substrate supporting member 410 may be coupled to the inside surface of the first housing 100. The first substrate supporting member 410 may be coupled to the inside surface of the first housing 100 together with the first substrate 310. The first substrate supporting member 410 may be coupled to the front surface of the first substrate 310. The first substrate supporting member 410 may be in contact with the second substrate supporting member 420. The first substrate supporting member 410 may include a screw coupling portion being screw-coupled to the inside surface of the first housing 100. The first substrate supporting member 410 may include a snap-fit coupling portion that is snap-fit coupled to a side surface of the first substrate 310.

The first substrate supporting member 410 may include a body 411, an extending portion 413, a hole 415, and a bent portion 414.

The body 411 may be formed with four metal plates forming a plurality of side surfaces. The extending portion 413 may be extended from the upper end of the body 411 in a direction perpendicular to the optical axis. The body 411 may be disposed on the inside surface of the first housing 100. The body 411 may be disposed between the inside surface of the first housing 100 and the first substrate 310. The body 411 may be disposed on the side surface 114 of the step portion 110 of the first housing 100. The body 411 may be disposed adjacent to the side surface 114 of the step portion 110 of the first housing 100.

The extending portion 413 may be formed to be extended in a horizontal direction from an upper end of the body 411. The extending portion 413 may be disposed between the inside surface of the first housing 100 and the first substrate 310. The extending portion 413 may be disposed on the upper surface 112 of the step portion 110. The lower surface of the extending portion 413 may be in contact with the inside surface of the first housing 100. The lower surface of the extending portion 413 may be in contact with the step portion 110 of the first housing 100. The lower surface of the extending portion 413 may be in contact with the upper surface 112 of the step portion 110 of the first housing 100. The extending portion 413 may include a plurality of extending portions. Each of the plurality of extending portions may be spaced apart. Each of the plurality of extending portions may be symmetrically disposed with respect to the optical axis.

The hole 415 may be formed in the extending portion 413. The hole 415 may be formed in the central region of the extending portion 413. The hole 415 may be overlapped with the through hole of the first substrate 310 and/or the through hole of the upper surface 112 of the step portion 110 of the first housing 100 in the optical axis direction or a vertical direction.

The bent portion 414 may be formed to be extended from the extending portion 413 in the inner direction of the hole 415. The bent portion 414 may be formed to be extended from the extending portion 413 toward the first substrate 310. The bent portion 414 may be formed to be extended upward from the extending portion 413. The upper surface 4143 of the bent portion 414 may be disposed above the extending portion 413. The upper surface 4143 of the bent portion 414 may be in contact with the lower surface of the first substrate 310. The upper surface 4143 of the bent portion 414 may be in surface-contact with the lower surface of the first substrate 310. The bent portion 414 may be curved at least twice. The bent portion 414 may include a first curved portion 4141 curved in the direction of the hole 415 in the extending portion 413, and a second curved portion 4142 curved in the direction opposite to the hole 415 in the first curved portion 4141. That is, the bent portion 414 may include at least one inflection point. Through this, space efficiency of the bent portion 414 may be improved, and elasticity may be improved. The bent portion 414 may include a plurality of bent portions. Each of the plurality of bent portions may be spaced apart from each other. A separation space 4144 may be formed between the multiple bent portions. Through this, when the coupling member 900 is fastened, a space in which the bent portion 414 can be pressed by the first substrate 310 and the upper surface 112 of the step portion 110 may be secured. That is, as the first substrate 310 and the first substrate supporting member 410 are screw-coupled to the first housing 100 by the coupling member 900, the bent portion 414 is gradually lowered in height to become flat. Through this, a tensile force is generated in the opposite direction to which the screw is coupled, so that the coupling member 900 can be prevented from being loosened.

The substrate supporting member 400 may include a second substrate supporting member 420. The second substrate supporting member 420 may be disposed between the first substrate 310 and the second substrate 320. The second substrate supporting member 420 may be in contact with the first substrate supporting member 410. The second substrate supporting member 420 may be in contact with the third substrate supporting member 430. One side of the second substrate supporting member 420 may be coupled to the rear surface of the first substrate 310, and the other side of the second substrate supporting member 420 may be coupled to the front surface of the second substrate 320.

The substrate supporting member 400 may include a third substrate supporting member 430. The third substrate supporting member 430 may be disposed between the second substrate 320 and the third substrate 330. The third substrate supporting member 430 may be in contact with the second substrate supporting member 420. The third substrate supporting member 430 may be in contact with the metal cover 700. One side of the third substrate supporting member 430 may be coupled to the rear surface of the second substrate 320, and the other side of the third substrate supporting member 430 may be coupled to the front surface of the third substrate 330. One side of the third substrate supporting member 430 may be inserted or mounted on the second substrate 320. The other side of the third substrate supporting member 430 may include a snap-fit coupling portion that is snap-fit coupled to the third substrate 330.

In an embodiment of the present invention, it has been described that there are three substrate supporting members 400 as an example, but the number of detailed configurations of the substrate supporting member 400 may be variously changed according to the number of detailed configurations of the substrate module 300. For example, when the substrate module 300 is composed of a first substrate 310 and a second substrate 320, the substrate supporting member 400 may be formed of a first substrate supporting member 410 and a second substrate supporting member 420 accommodating at least a portion of the first substrate 310 and the second substrate 320. In addition, in an embodiment of the present invention, the first to third substrate supporting members 410, 420, and 430 have been described as an example that they are separated from each other, but the first to third substrate supporting members 410, 420, and 430 may be integrally formed.

The camera module 10 may include a connector 500. The connector 500 may be disposed in the inside space of the first housing 100 and the second housing 200. The connector 500 may be electrically connected to the substrate module 300. The connector 500 may be coupled to the rear surface of the third substrate 330. At least a portion of the connector 500 may penetrate through the third substrate 330. The connector 500 may be mounted on the third substrate 330 from the rear of the third substrate 330. The connector 500 may be electrically connected to the third substrate 330. The connector 500 may penetrate through the second housing 200. The connector 500 may penetrate through a through hole formed in the second housing 200. The connector 500 may be connected to an external component to supply power and/or current to the substrate module 300. In an embodiment of the present invention, the connector 500 is described as an example that is formed in a round circular column shape, but is not limited thereto and may be variously changed into a rectangular column shape and the like. A metal ring 600 may be disposed on the outer circumferential surface of the connector 500. The connector 500 may be in contact with the metal ring 600. The connector 500 may include a ground portion being in contact with the metal ring.

The camera module 10 may include a metal ring 600. The metal ring 600 may be disposed in the inside space of the first housing 100 and the second housing 200. The metal ring 600 may be disposed in the connector 500. The metal ring 600 may be disposed on the outer circumferential surface of the connector 500. The metal ring 600 may be in contact with the ground portion of the connector 500. The metal ring 600 may be in contact with the metal cover 700. At least a portion of the metal ring 600 may be bent. The metal ring 600 may not be in contact with the first housing 100. The metal ring 600 may not be in contact with the second housing 200. The metal ring 600 may be formed of a metal material. The metal ring 600 may block electromagnetic interference (EMI). The metal ring 600 may block radio waves generated from outside from flowing into the substrate module 300. The metal ring 600 may ground the substrate module 300. The metal ring 600 may ground the substrate module 300 through the ground portion of the connector 500. The metal ring 600 may include a circular portion and at least one connecting portion.

The metal ring 600 may include a circular portion. The circular portion may be formed in a round ring shape. The inside surface of the circular portion may be in contact with the outer circumferential surface of the connector 500. The inside surface of the circular portion may be disposed on a ground portion formed in the connector 500. The inside surface of the circular portion may be in contact with the ground portion formed in the connector 500. At least one connecting portion may be formed by being extended from the circular portion. The connecting portion may include a horizontal region being extended in a horizontal direction from the circular portion and an inclined region being extended inclining to the rear. The circular portion may be integrally formed with at least one connecting portion. The circular portion may be formed of the same material as at least one connecting portion.

The metal ring 600 may include at least one connecting portion. The metal ring 600 may include a plurality of connecting portions. The connecting portion may be formed being extended from the circular portion. The connecting portion may be integrally formed with the circular portion. The connecting portion may be formed of the same material as the circular portion. The connecting portion may be formed being extended from the circular portion to the rear. The connecting portion may be formed being extended outward from the circular portion. At least portion of the connecting portion may be bent. The connecting portion may be in contact with the metal cover 700. The area of the connecting portion in contact with the metal cover 700 may be formed in a letter 'U' shape. The connecting portion may be in surface-contact with the metal cover 700. The plurality of connecting portions may be formed symmetrically with each other around the circular portion. A plurality of connecting portions may be disposed spaced apart from each other. A plurality of connecting portions may be formed in a shape corresponding to each other. The inclined region of the connecting portion may have elasticity. When the first housing 100 and the second housing 200 are coupled, the connecting portion may be pressed forward by the second housing 200. Through this, the contact between the letter 'U'-shaped region of the connecting portion and the metal cover 700 may be maintained. The connecting portion may be disposed to be spaced apart from the second housing 200. At least a portion of the connecting portion may be bent so that a distance separated from the second housing 200 is always constant.

The camera module 10 may include a metal cover 700. The metal cover 700 may have a block shape with an open lower portion. The metal cover 700 may be disposed on the inside surface of the second housing 200. The metal cover 700 may be disposed on the inside surface of the first housing 100. The metal cover 700 may be in contact with the metal ring 600. The metal cover 700 may be in contact with the substrate supporting member 400. The metal cover 700 may be formed of a metal material. The metal cover 700 may be formed as a metal plate is forming a plurality of side surfaces and rear surfaces. The metal cover 700 may block electromagnetic interference (EMI). The metal cover 700 may block radio waves generated from outside from flowing into the substrate module 300. Residual electromagnetism remaining in the substrate module 300 may be delivered to the metal cover 700 through the substrate supporting member 400. In addition, residual electromagnetism remaining in the metal cover 700 may be delivered to the outside through the metal ring 600 and the connector 500. For example, residual electromagnetism of the first substrate 310 may be delivered to the outside by sequentially passing through a first substrate supporting member 410, a second substrate supporting member 420, a third substrate supporting member 430, a metal cover 700, a metal ring 600, and a connector 500. The residual electromagnetism of the second substrate 320 may be delivered to the outside by sequentially passing through a second substrate supporting member 420, a third substrate supporting member 430, a metal cover 700, a metal ring 600, and a connector 500. The residual electromagnetism of the third substrate 330 may be delivered to the outside by sequentially passing through a third substrate supporting member 430, a metal cover 700, the metal ring 600, and a connector 500. Alternatively, residual electromagnetism of the third substrate 330 may be directly delivered to the outside through the connector 500.

The camera module 10 may include a lens module 800. The lens module 800 may include at least one lens. The lens module 800 may be coupled to the first housing 100. The lens module 800 may face the image sensor disposed on the substrate module 300 in the optical axis direction. The lens module 800 may be penetrating through the first housing 100. The lens module 800 may be screw-coupled to the first housing 100. A thread may be formed on the outer circumferential surface of the lens module 800. The lens module 800 may be coupled to the first housing 100 from the front.

The camera module 10 may include a coupling member 900. The coupling member 900 may fix the substrate module 300 to the first housing 100. The coupling member 900 may fix the substrate supporting member 400 to the first housing 100. The coupling member 900 may fix the first substrate 310 and the first substrate supporting member 410 to the first housing 100. The coupling member 900 may fix the first substrate 310 and the first substrate supporting member 410 to the step portion 110 of the first housing 100. The coupling member 900 may include a screw. The coupling member 900 may sequentially penetrate through the through hole of the first substrate 310, the hole 415 of the first substrate supporting member 410, and the through hole of the step portion 110.

FIGS. 7 to 10 are assembly views of a camera module according to an embodiment of the present invention.

Figure 7:
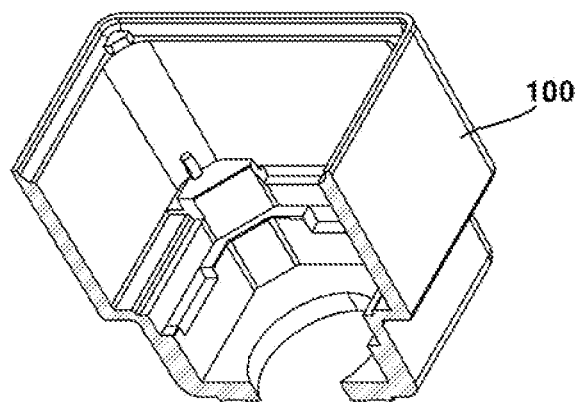
FIGS. 7 to 10 are assembly views of a camera module according to an embodiment of the present invention.
Figure 8:
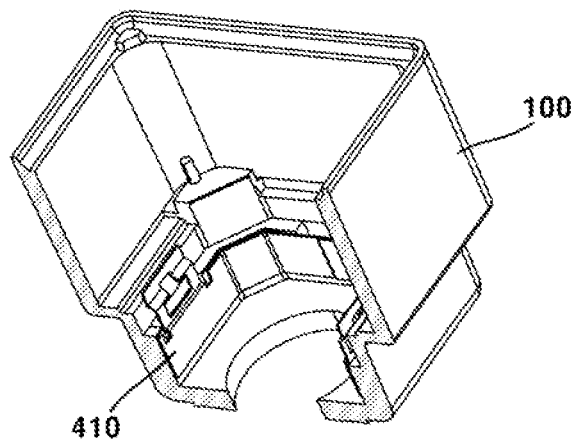

Referring to FIGS. 7 and 8, the first substrate supporting member 410 is disposed on the inside surface of the first housing 100. In this case, the position of the first substrate supporting member 410 may be determined through the step portion 110 of the first housing 100.

Figure 9:
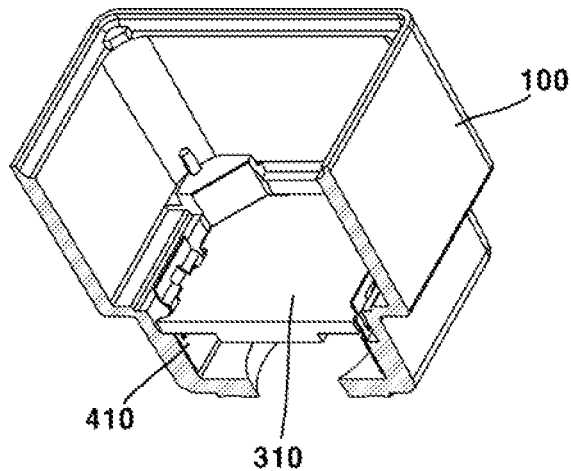

Referring to FIG. 9, a first substrate 310 is disposed in the first housing 100. In this case, the first substrate 310 is disposed on an upper surface 122 of the step portion 110, and the side surface of the first substrate 310 may be snap-fit coupled to the snap-fit coupling portion of the first substrate supporting member 410.

Figure 10:
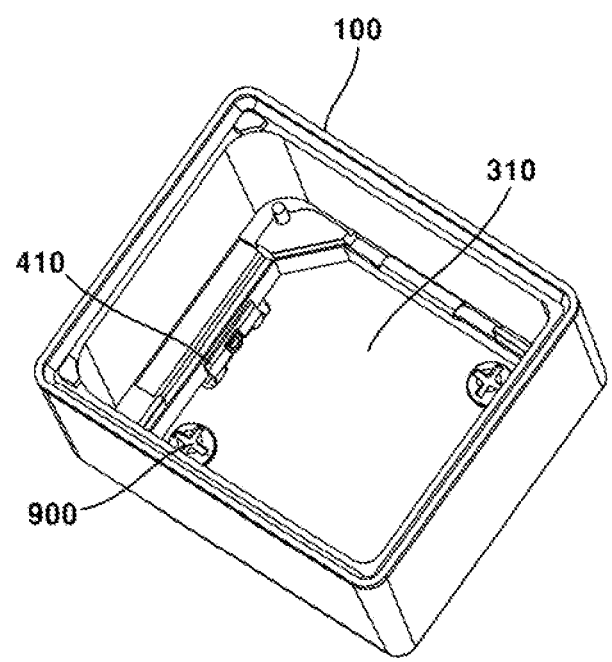

Referring to FIG. 10, the first substrate 310 and the first substrate supporting member 410 are screw-coupled to the first housing 100 through a coupling member 900. As the coupling member 900 is rotated, the height of the bent portion 414 of the first substrate supporting member 410 is lowered, and the distance between the first substrate 310 and the upper surface 112 of the step portion 410 becomes narrower. In this case, it is possible to prevent the coupling member 900 from loosening due to an elastic force or a tensile force of the bent portion 414. Accordingly, it is possible to prevent the optical axis of the lens module 800 and the image sensor from being misaligned.

The embodiments of the present invention have been described above with reference to the accompanying drawings, but a person skilled in the art to which the present invention belongs may understand that the present invention can be implemented in other specific forms without changing the technical spirit or essential features. Therefore, it should be understood that the embodiments described above are illustrative and non-limiting in all respects.

The invention claimed is:

1. A camera module comprising:
a housing,
a substrate disposed in the housing;
a substrate supporting member disposed in the housing and supporting the substrate; and
a coupling member for fixing the substrate at the housing,
wherein the substrate supporting member comprises: a body;
an extending portion extended from the body to be disposed between the substrate and an inside surface of the housing;
a hole formed in the extending portion; and
a bent portion extended from the extending portion inwardly of the hole and towards the substrate.

2. The camera module according to claim 1, wherein the extending portion is extended from an upper end of the body in a direction perpendicular to an optical axis.

3. The camera module according to claim 1, wherein a lower surface of the extending portion is in contact with the inside surface of the housing.

4. The camera module according to claim 1, wherein an upper surface of the bent portion is in contact with a lower surface of the substrate.

5. The camera module according to claim 4, wherein the upper surface of the bent portion is in surface-contact with the lower surface of the substrate.

6. The camera module according to claim 1, wherein the bent portion is curved at least twice.

7. The camera module according to claim 6, wherein the bent portion includes a first curved portion curved from the extending portion in a direction to the hole, and a second curved portion curved from the first curved portion in a direction opposite to the hole.

8. The camera module according to claim 1, wherein the bent portion comprises a plurality of bent portions, and the plurality of bent portions is spaced apart from each other.

9. The camera module according to claim 1, wherein the extending portion includes two extending portions, and each of the two extending portions is symmetrical to each other with respect to the optical axis.

10. The camera module according to claim 1, wherein the coupling member screw-couples the substrate to the inside surface of the housing.

11. The camera module according to claim 1, wherein the substrate supporting member comprises a screw coupling portion screw-coupled to the inside surface of the housing.

12. The camera module according to claim 11, wherein the body of the substrate supporting member is disposed on a side surface of the step portion, and the extending portion of the substrate supporting member is disposed on an upper surface of the step portion.

13. The camera module according to claim 1, wherein the substrate supporting member comprises a snap-fit coupling portion snap-fit-coupled to a side surface of the substrate.

14. The camera module according to claim 1, wherein the housing comprises a step portion formed on the inside surface of the housing.

15. The camera module according to claim 1, wherein the substrate comprises:
a first substrate disposed in the housing and fixed by the coupling member; and
a second substrate disposed in the housing, spaced apart from the first substrate in an optical axis direction, and electrically connected to the first substrate.

16. The camera module according to claim 15, wherein the substrate comprises a third substrate disposed in the housing, and the third substrate is spaced apart from the second substrate in an optical axis direction and electrically connected to the second substrate, and
wherein the third substrate is coupled to a connector.

17. A camera module comprising:
a first housing;
a second housing coupled to the first housing;

a substrate disposed in the first housing and comprising a first substrate, a second substrate, and a third substrate; and a first substrate supporting member disposed between the first housing and the first substrate, a second substrate supporting member disposed between the first substrate and the second substrate, and a third substrate supporting member disposed between the third substrate and the second housing, wherein the first substrate supporting member comprises:

a body;

an extending portion extended from the body to be disposed between the first substrate and an inside surface of the first housing;

a hole formed in the extending portion, and a bent portion extended from the extending portion inwardly of the hole and towards the first substrate.

18. The camera module according to claim 17, wherein the extending portion is extended from an upper end of the body in a direction perpendicular to an optical axis.

19. The camera module according to claim 17, wherein a lower surface of the extending portion is in contact with the inside surface of the first housing.

20. A camera module comprising:

a housing;

a substrate disposed in the housing; and a substrate supporting member disposed in the housing and supporting the substrate, wherein the substrate supporting member comprises:

a body;

an extending portion extended from the body to be disposed between the substrate and an inside surface of the housing, and having a hole; and a bent portion extended from the extending portion inwardly of the hole.

* * * * *